(12) United States Patent
Zhang

(10) Patent No.: US 11,777,405 B2
(45) Date of Patent: Oct. 3, 2023

(54) BOOST OFF TIME ADAPTIVE ADJUSTMENT UNIT AND POWER CONVERTER COMPRISING THE SAME

(71) Applicant: Chengdu Monolithic Power Systems Co., Ltd., Chengdu (CN)

(72) Inventor: Jian Zhang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 187 days.

(21) Appl. No.: 17/551,765

(22) Filed: Dec. 15, 2021

(65) Prior Publication Data

US 2022/0200455 A1    Jun. 23, 2022

(30) Foreign Application Priority Data

Dec. 21, 2020   (CN) ......................... 202011514258.5

(51) Int. Cl.
*H02M 3/158*   (2006.01)
*H02M 1/32*    (2007.01)

(52) U.S. Cl.
CPC ........... *H02M 3/1582* (2013.01); *H02M 1/32* (2013.01)

(58) Field of Classification Search
CPC ............................. H02M 3/1582; H02M 1/32
See application file for complete search history.

(56) References Cited

U.S. PATENT DOCUMENTS

| | | | |
|---|---|---|---|
| 10,250,141 B2 * | 4/2019 | Zhang | H02M 1/32 |
| 11,277,127 B1 * | 3/2022 | Mantooth | H03K 17/693 |
| 2015/0381039 A1 * | 12/2015 | Hari | H02M 1/15 323/271 |
| 2018/0041126 A1 * | 2/2018 | Zhang | H02M 3/1582 |
| 2018/0316181 A1 * | 11/2018 | Furuya | H02H 7/1213 |
| 2022/0158546 A1 * | 5/2022 | Lind | H02M 1/0025 |

* cited by examiner

*Primary Examiner* — Rafael O Leon De Domenech
(74) *Attorney, Agent, or Firm* — Perkins Coie LLP

(57) ABSTRACT

A power converter, a boost off time adaptive adjustment unit and a boost cycle short circuit protection module for controlling an off time of a boost cycle of the power converter. The boost off time adaptive adjustment unit is adapted to generate an off time control signal based at least on an input voltage and an output voltage of the power converter to regulate the off time of the boost cycle to change in an opposite direction to the output voltage when the power converter is operating normally during the boost cycle, and to regulate the off time of the boost cycle to change in a same direction as the output voltage when a short-circuit fault occurs during the power converter operating in the boost cycle.

20 Claims, 3 Drawing Sheets

BOOST OFF TIME ADAPTIVE ADJUSTMENT UNIT AND POWER CONVERTER COMPRISING THE SAME

CROSS REFERENCE

This application claims the benefit of CN application No. 202011514258.5 filed on Dec. 21, 2020 and incorporated herein by reference.

TECHNICAL FIELD

This disclosure relates generally to power converters, and more particularly but not exclusively relates to power converters having boost cycle or boost mode and short circuit protection thereof.

BACKGROUND

Power converters having boost cycle or boost mode, such as boost switching mode power converters and buck-boost switching power converters etc., may be able to convert an input voltage into an output voltage higher than the input voltage. However, in practical applications, it may happen that output of the switching power converter is short-circuited during the boost cycle or boost mode. For this situation, it is necessary to provide an effective short-circuit protection mechanism to avoid circuit damage.

SUMMARY

In accomplishing the above and other objects, there has been provided, in accordance with an embodiment of the present disclosure, a power converter including boost cycle(s). The power converter may comprise: a switch module, adapted to regulate energy or power transmission from an input port to an output port of the power converter in response to at least one control signal; and a control circuit, adapted to provide the at least one control signal to control the switch module to perform on and off switching. The control circuit may comprise a boost off time adaptive adjustment unit having a first input terminal adapted to be coupled to the input port of the power converter, a second input terminal adapted to be coupled to the output port of the power converter, and an output terminal adapted to provide an off time control signal. The boost off time adaptive adjustment unit may be adapted to generate the off time control signal based at least on an input voltage at the input port and an output voltage at the output port, and wherein when the power converter is operating normally during a boost cycle, the off time control signal is configured to regulate the off time of the boost cycle to change in an opposite direction to the output voltage, and wherein when a short-circuit fault occurs during the power converter operating in the boost cycle, the off time control signal is configured to regulate the off time of the boost cycle to change in a same direction as the output voltage.

In accordance with an exemplary embodiment, the boost off time adaptive adjustment unit may comprise: a boost off time control module, adapted to provide the off time control signal based at least on the input voltage and the output voltage, and further adapted to adjust the off time of the boost cycle to vary in the opposite direction to the output voltage based on the off time control signal; and a boost cycle short circuit protection module, adapted to provide a short circuit protection signal based at least on the input voltage and the output voltage, and wherein if the short-circuit fault occurs during the power converter operating in the boost cycle, the boost cycle short circuit protection module is further adapted to make the short circuit protection signal to act on the boost off time control module to adjust the off time of the boost cycle to vary in the same direction as the output voltage.

There has also been provided, in accordance with an embodiment of the present disclosure, a boost off time adaptive adjustment unit for controlling an off time of a boost cycle of a power converter. The boost off time adaptive adjustment unit may comprise: a first input terminal, adapted to be coupled to an input port of the power converter; a second input terminal, adapted to be coupled to an output port of the power converter; and an output terminal, adapted to provide an off time control signal; wherein the boost off time adaptive adjustment unit is adapted to generate the off time control signal based at least on an input voltage at the input port and an output voltage at the output port, and wherein when the power converter is operating normally during the boost cycle, the off time control signal is configured to regulate the off time of the boost cycle to change in an opposite direction to the output voltage, and wherein when a short-circuit fault occurs during the power converter operating in the boost cycle, the off time control signal is configured to regulate the off time of the boost cycle to change in a same direction as the output voltage.

There has further been provided, in accordance with an embodiment of the present disclosure, a boost cycle short circuit protection module for a power converter having a boost cycle, wherein the boost cycle short circuit protection module is adapted to provide a short circuit protection signal based at least on an input voltage and an output voltage of the power converter, wherein if a short-circuit fault occurs during the power converter operating in the boost cycle, the boost cycle short circuit protection module is further adapted to make the short circuit protection signal to adjust an off time of the boost cycle to vary in a same direction as the output voltage.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

Figure 1:
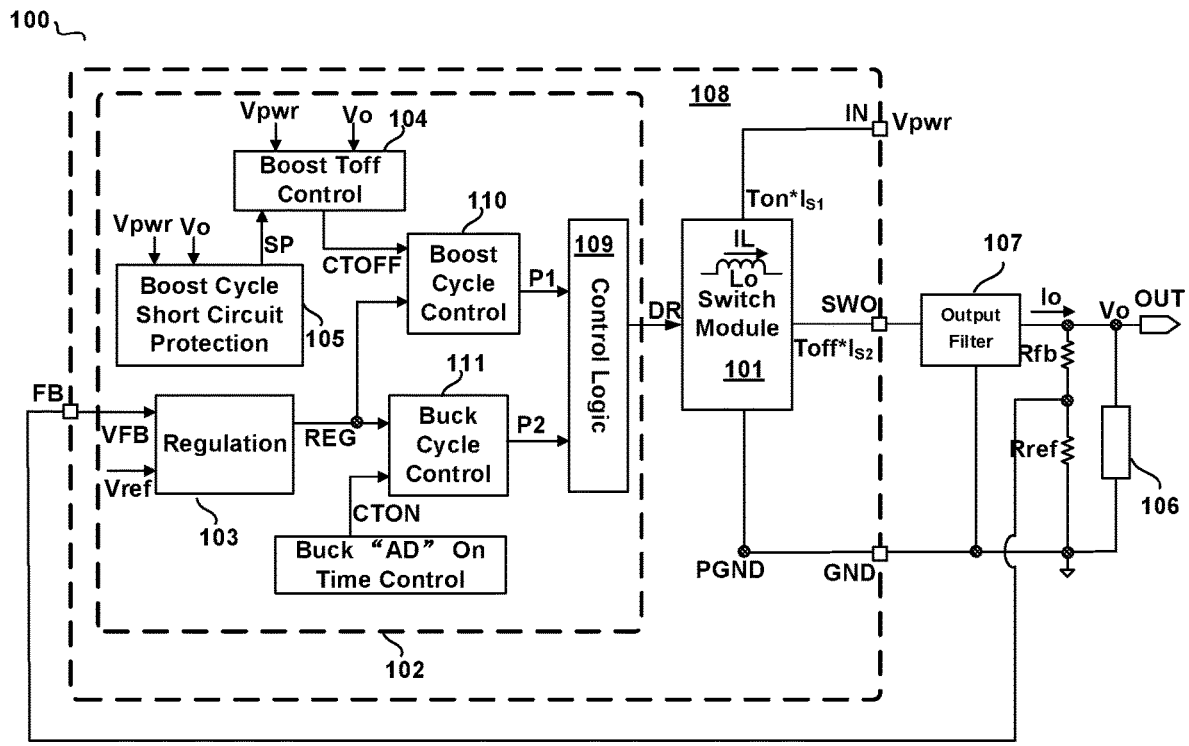
FIG. 1 illustrates a schematic diagram of a power converter 100 in accordance with an exemplary embodiment of the present invention.

The use of the same reference label in different drawings indicates the same or like components or structures with substantially the same functions for the sake of simplicity.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. When an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. The terms "a," "an," and "the" include plural reference, and the term "in" includes "in" and "on". Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example, although it may. Furthermore, the features, structures, or characteristics may be combined in one or more embodiments or examples. In addition, it should be noted that the drawings are provided for illustration, and are not necessarily to scale. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

FIG. 1 illustrates a schematic diagram of a power converter 100 in accordance with an exemplary embodiment of the present invention. The power converter 100 may be configured to receive an input voltage Vpwr at an input port IN and to provide an output voltage Vo and an output current Io for supplying a load at an output port OUT. The power converter 100 may comprise a switch module 101, adapted to regulate energy or power transmitted from the input port IN (or the input power supply Vpwr) to the output port OUT (or to the load 106) in response to control signal(s) (e.g. a control signal DR illustrated in the example of FIG. 1). The power converter 100 may further comprise a control circuit 102, adapted to provide the control signal(s) to the switch module 101 based on information indicative of the input voltage Vpwr, information indicative of the output voltage Vo, and/or information indicative of the output current Io etc.

In accordance with an exemplary embodiment of the present invention, the switch module 101 may adopt any DC to DC or AC to DC or DC to AC power conversion topology that may be operable in operation cycles or operation modes including boost cycle or boost mode to perform boost conversion, for example, an isolated or non-isolated synchronous or non-synchronous switching power conversion topology that may be operable in operation cycles or operation modes including boost cycle or boost mode may be adopted.

In accordance with an exemplary embodiment of the present invention, the switch module 101 may be adapted to be configurable for controlling switching of energy storage and energy release in an inductive energy storage device based on the control signal(s) (such as the control signal DR illustrated in FIG. 1), thereby converting the input voltage Vpwr into the output voltage Vo. Generally, a period during which the switch module 101 may be configured to couple the inductive energy storage device to the input voltage Vpwr for energy storage may be referred to as an on time Ton (which can also be considered as an on time of the switch module 101 or may also be referred to as an on time of the power converter 100), and a period during which the switch module 101 may be configured to couple the inductive energy storage device to the load 106 for energy release may be referred to as an off time Toff (which can also be considered as an off time of the switch module 101 or may also be referred to as an off time of the power converter 100). The sum of the on time Ton and the off time Toff experienced every time a switching between the energy storage and the energy release in the inductive energy storage device is completed may be referred to as an operating cycle or switching cycle of the power converter 100, and a ratio of the on time Ton to the sum of the on time Ton and the off time Toff in each operating cycle may be referred to as an on-duty ratio of the switching module 101 or a duty ratio of the power converter 100. Therefore, by controlling on and off switching of the switch module 101, e.g. switching cycle by switching cycle, based on the control signal(s) (e.g. the control signal DR in the example of FIG. 1), the on time Ton and/or the off time Toff or the duty ratio may be regulated, that is, the proportion of the energy storage period and/or the energy release period in each operating/switching cycle can be adjusted, thereby adjusting the energy or power transmitted to the load 106 or adjusting the output voltage Vo at the output port OUT. In an embodiment, the switch module 101 may be adapted to allow passing or flowing of a first switching current $I_{S1}$ during the on time Ton and may further be adapted to allow passing or flowing of a second switching current $I_{S2}$ during the off time Toff. The first switching current $I_{S1}$ may actually be considered as equal to an inductor current IL flowing through the inductive energy storage device during the on time Ton while the second switching current $I_{S2}$ may be considered as equal to the inductor current IL flowing through the inductive energy storage device during the off time Toff. The output current Io may be considered as an average of the inductor current IL (or of the sum of the first switching current $I_{S1}$ and the second switching current $I_{S2}$) during each switching cycle or operating cycle of the power converter 100.

In accordance with an exemplary embodiment of the present invention, the switch module 101 and the control circuit 102 may be fabricated and/or integrated on a same semiconductor die or on separate semiconductor dies, and may be packaged in a chip 108. The circuitries or circuit elements packaged in the chip 108 may be referred to as internal circuitries or circuit elements. The power converter 100 may have an internal reference power ground PGND that may be coupled to a ground pin GND of the chip 108 through for example packaging interconnection elements such as interconnection wires or interconnection bumps etc.

In accordance with an exemplary embodiment of the present invention, the power converter 100 may further comprise an output filtering module 107 comprising, for example, a capacitive energy storage component Co coupled between the output port OUT and the ground pin GND. The output filtering module 107 may be adapted to filter a switching output SWO of the switch module 101 so as to smooth the output voltage Vo at the output port OUT.

In accordance with an exemplary embodiment of the present invention, the power converter 100 may further comprise a feedback circuit that may be adapted to detect the output voltage Vo to provide a feedback signal Vfb which may be indicative of the output voltage Vo. In the example of FIG. 1, the feedback circuit may be coupled to the output port OUT and is illustrated to comprise a first feedback resistor Rf1 and a second feedback resistor Rf2 connected in series between the output port OUT and the ground pin GND. The feedback signal Vfb may be provided from a common connection of the first feedback resistor Rf1 and the second feedback resistor Rf2. In other embodiments, the feedback circuit may comprise other circuit elements that are suitable to provide the feedback signal Vfb. In certain embodiment, the power converter 100 may not comprise the feedback circuit and the output voltage Vo may be provided or used as the feedback signal Vfb.

Figure 2:
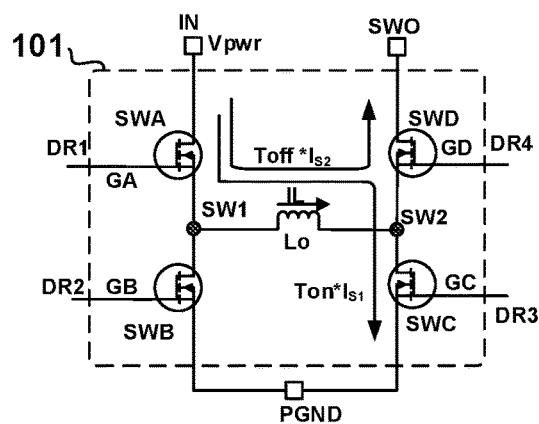
FIG. 2 illustrates a schematic diagram of a switch module 101 in accordance with an exemplary embodiment of the present invention.

In accordance with an exemplary embodiment of the present invention, referring to the illustration in FIG. 2, the switch module 101 may comprise a first power switch SWA, a second power switch SWB, a third power switch SWC and a fourth power switch SWD. The switch module 101 may have a first terminal adapted to be coupled to the input port IN, a second terminal adapted to be coupled to the output port OUT (or to the switching output SWO), and a plurality of control terminals (e.g. a first control terminal GA, a second control terminal GB, a third control terminal GC and a fourth control terminal GD illustrated in FIG. 2) adapted to respectively receive a plurality of control signals (e.g. a first control signal DR1, a second control signal DR2, a third control signal DR3 and a fourth control signal DR4 illustrated in FIG. 2). The switch module 101 may be adapted to be configurable to perform ON and OFF switching based on the plurality of control signals. In accordance with an exemplary embodiment, the first power switch SWA and the second power switch SWB may be coupled in series between the input port IN and the internal reference power ground PGND, and the third power switch SWC and the fourth power switch SWD may be coupled in series between the switching output SWO and the internal reference power ground PGND, wherein the first power switch SWA and the second power switch SWB have a common connection SW1 referred to as a first switching node SW1, and the third power switch SWC and the fourth power switch SWD have a common connection SW2 referred to as a second switching node SW2. In an exemplary embodiment, an inductive energy storage device Lo may be coupled between the first switching node SW1 and the second switching node SW2. In an exemplary embodiment, the first to fourth power switches SWA, SWB, SWC and SWD may comprise controllable switching components, such as metal oxide semiconductor field effect transistors (MOSFETs) as shown in FIG. 2. The first to fourth power switches SWA, SWB, SWC and SWD may respectively have their own control terminals, such as the first control terminal GA, the second control terminal GB, the third control terminal GC and the fourth control terminal GD illustrated in FIG. 2, to respectively receive the first control signal DR1, the second control signal DR2, the third control signal DR3 and the fourth control signal DR4. If the switch module 101 having the configuration shown in FIG. 2 is used in the power converter 100, the power converter 100 may be referred to have a buck-boost power conversion topology and may be referred to as a buck-boost power converter.

In accordance with an exemplary embodiment of the present invention, if the power converter 100 has the buck-boost power conversion topology, the control circuit 200 may be adapted to be configurable to provide the plurality of control signals (e.g. including the first control signal DR1, the second control signal DR2, the third control signal DR3 and the fourth control signal DR4 illustrated in FIG. 2) to the exemplary switch module 101 of FIG. 2 at least partially based on the feedback signal Vfb. In accordance with an exemplary embodiment, the first power switch SWA and the second power switch SWB may form a first switch pair (also referred to as a buck switch pair). The third power switch SWC and the fourth power switch SWD may form a second switch pair (also referred to as a boost switch pair). The control circuit 102 is adapted to control the first switch pair and the second switch pair to perform ON and OFF switching independently. The control circuit 200 may be adapted to regulate the buck-boost power converter 100 to at least operate in one of a buck mode (when the input voltage Vpwr is higher than the output voltage Vo), a boost mode (when the input voltage Vpwr is lower than the output voltage Vo) and a buck-boost mode (when the input voltage Vpwr is equal or very close to the output voltage Vo) according to the relative value of the input voltage Vpwr and the output voltage Vo.

In accordance with an exemplary embodiment of the present invention, the buck-boost power converter 100 may be regulated to operate in the buck mode when the input voltage Vpwr is higher than the output voltage Vo. In the buck mode, the control circuit 102 may be configured to regulate the first switch pair to perform ON and OFF switching, and to regulate the third power switch SWC and the fourth power switch SWD in the second switch pair to respectively remain OFF and ON. For this situation, the buck-boost power converter 100 actually has a buck type topology. In an embodiment, in the buck mode, the control circuit 102 may be configured to regulate the first power switch SWA and the second power switch SWB to perform on ON and OFF switching in a complementary manner, i.e. when the first power switch SWA is switched ON, the second power switch SWB is switched OFF, and vice versa. A fraction of an ON time of the first power switch SWA to an entire switching cycle of the first power switch SWA and the second power switch SWB (sum of the on time Ton and the off time Toff) may be referred to as a buck duty ratio.

In accordance with an exemplary embodiment of the present invention, if the input voltage Vpwr decreases to be equal or close to the output voltage Vo, the buck-boost power converter 100 may be regulated to operate in the buck-boost mode. In the buck-boost mode, the control circuit 102 may be configured to regulate the first switch pair and the second switch pair to perform ON and OFF switching independently, and may further be configured to control the first switch pair and the second switch pair to operate alternately switching cycle by switching cycle (i.e. the control circuit 102 may be adapted to make the first switch pair operate for one switching cycle and the second switch pair operate for one switching cycle alternately), wherein a switching cycle during which the first switch pair is operated to perform ON and OFF switching (or namely a switching period during which the first power switch SWA and the second power switch SWB operate/work and complete one turn-on and turn-off switching) may be referred to as a buck cycle, and a switching cycle during which the second switch pair is operated to perform ON and OFF switching (or namely a switching period during which the third power switch SWC and the fourth power switch SWD operate/work and complete one turn-on and turn-off switching) may be referred to as a boost cycle. Therefore, a buck-boost cycle comprises a buck cycle and a boost cycle. In an embodiment, during a buck cycle, the control circuit 102 may be configured to regulate the first power switch SWA and the second power switch SWB in the first switch pair to switch ON and OFF complementarily, and may further be configured to regulate the third power switch SWC to remain OFF and the fourth power switch SWD to remain ON. Thus, during the buck cycle, when the first power switch SWA is switched ON and the second power switch SWB is switched OFF, the first power switch SWA and the fourth power switch SWD among the four power switches SWA, SWB, SWC and SWD are actually ON, and this situation is referred to as "AD" in the present disclosure. In contrast, during the buck cycle, when the first power switch SWA is switched OFF and the second power switch SWB is switched ON, the second power switch SWB and the fourth power switch SWD among the four power switches SWA, SWB, SWC and SWD are actually ON, and this situation is referred to as "BD" in the present disclosure. During a boost cycle, the control circuit 102 may be configured to regulate the third power switch SWC and the fourth power switch SWD in the second switch pair to switch ON and OFF complementarily, and may further be configured to regulate the first power switch SWA to remain ON and the second power switch SWB to remain OFF. Thus, during each boost cycle, when the third power switch SWC is switched ON and the fourth power switch SWD is switched OFF, the inductive power storage device Lo is coupled to the input port IN to receive power from the input voltage Vpwr for energy storage, and a time duration of the third power switch SWC ON and the fourth power switch SWD OFF may be referred to as the on time Ton of the boost cycle. For the examples in FIG. 1 and FIG. 2, during the on time Ton of each boost cycle, the first power switch SWA and the third power switch SWC among the four power switches SWA, SWB, SWC and SWD are actually ON, and this situation is referred to as "AC" in the present disclosure. In contrast, during each boost cycle, when the third power switch SWC is switched OFF and the fourth power switch SWD is switched ON, the inductive power storage device Lo is coupled to the output port OUT for energy release e.g. to the load 106, and a time duration of the third power switch SWC OFF and the fourth power switch SWD ON may be referred to as the off time Toff of the boost cycle. For the examples in FIG. 1 and FIG. 2, during the off time Toff of each boost cycle, the first power switch SWA and the fourth power switch SWD among the four power switches SWA, SWB, SWC and SWD are actually ON, and this situation is referred to as "AD" in the present disclosure.

To help understanding, the example in FIG. 2 illustrates out the first switching current $I_{S1}$ and the second switching current $I_{S2}$ when the power converter 100 operates in a boost cycle. When operating in the boost cycle, during the on time Ton, the switch module 101 may be adapted to couple the inductive energy storage device Lo to the input voltage Vpwr for energy storage through a conduction path of the first power switch SWA and the third power switch SWC, and the first switching current $I_{S1}$ flows through the conduction path of the first power switch SWA and the third power switch SWC; during the off time Toff, the switch module 101 may be adapted to couple the inductive energy storage device Lo to the load 106 for energy release through a conduction path of the first power switch SWA and the fourth power switch SWD, and the second switching current $I_{S2}$ flows through the conduction path of the first power switch SWA and the fourth power switch SWD.

In accordance with an exemplary embodiment of the present invention, if the input voltage Vpwr decreases to be lower than the output voltage Vo, the buck-boost power converter 100 may be regulated to operate in the boost mode. In the boost mode, the control circuit 102 may be configured to regulate the second switch pair to perform ON and OFF switching, and to regulate the first power switch SWA and the second power switch SWB in the first switch pair to respectively remain OFF and ON. In this situation, the buck-boost power converter 100 actually has a boost type topology. In an embodiment, in the boost mode, the control circuit 102 may be configured to regulate the third power switch SWC and the fourth power switch SWD to perform ON and OFF switching in a complementary manner, i.e. when the third power switch SWC is switched ON, the fourth power switch SWD is switched OFF, and when the third power switch SWC is switched ON, the fourth power switch SWD is switched OFF. In the boost mode, a switching cycle during which the control circuit 102 controls the boost switch pair (the third power switch SWC and the fourth power switch SWD) in the switch module 101 to perform ON and OFF switching (or namely a switching period during which the third power switch SWC and the fourth power switch SWD operate/work and complete one turn-on and turn-off switching) may be referred to as a boost cycle. Then, in the boost mode, it may be understood that the power converter 100 continuously works in boost cycles. During each boost cycle, a time duration of the third power switch SWC ON and the fourth power switch SWD OFF may be referred to as the on time Ton of the boost cycle while a time duration of the third power switch SWC OFF and the fourth power switch SWD ON may be referred to as the off time Toff of the boost cycle. Generally, a fraction of the on time Ton of the third power switch SWC to an entire switching cycle of the third power switch SWC and the fourth power switch SWD (sum of the on time Ton and the off time Toff) may be referred to as a boost duty ratio.

In accordance with an exemplary embodiment of the present invention, the control circuit 102 may comprise a regulation module 103. The regulation module 103 may be adapted to at least perform calculations between the feedback signal Vfb indicative of the output voltage Vo and a reference signal Vref to provide a regulation signal REG carrying information indicative of a difference between the feedback signal Vfb and the reference signal Vref. According to different control methods adopted by the control circuit 102, such as peak current controlling pulse width modulation control method, on-time control method, or off-time control method, etc., the regulation unit 103 may perform more than just the calculations to the feedback signal Vfb and the reference signal Vref, and possibly further perform calculations with for example a current sensing signal indicative of the inductor current IL involved in except the feedback signal Vfb and the reference signal Vref, which are not beyond the spirit and protection scope of the present disclosure.

In accordance with an exemplary embodiment of the present invention, the control circuit 102 may further comprise for example a boost off time ("Toff") control module 104 which may be adapted to provide an off time control signal CTOFF based at least on the input voltage Vpwr at the input port IN and the output voltage Vo at the output port OUT. In an exemplary embodiment, when the power converter 100 operates/works normally during a boost cycle (for example, in the boost cycle, when the output voltage Vo is greater than the supply voltage Vpwr), the boost Toff control module 104 may further be adapted to adjust the off time Toff of the boost cycle based on the off time control signal CTOFF to vary in an opposite direction to the output voltage Vo, namely: the boost Toff control module 104 may be adapted to adjust the off time Toff to increase as the output voltage Vo decreases, and to decrease as the output voltage Vo increases. The boost Toff control module 104 may further be adapted to adjust the off time Toff of each boost cycle based on the off time control signal CTOFF to vary in a same direction as the input voltage Vpwr, namely: the boost Toff control module 104 may be adapted to adjust the off time Toff to increase as the input voltage Vpwr increases and to decrease as the input voltage Vpwr decreases.

In accordance with an exemplary embodiment of the present invention, the control circuit 102 may further comprise for example a boost cycle short circuit protection module 105. The boost cycle short circuit protection module 105 may be adapted to provide a short circuit protection signal SP based at least on the input voltage Vpwr at the input port IN and the output voltage Vo at the output port OUT. When the power converter 100 operates/works normally during a boost cycle (for example, in the boost cycle, when the output voltage Vo is greater than the supply voltage Vpwr), the boost cycle short circuit protection module 105 or the short circuit protection signal SP may have no effect on the boost Toff control module 104 (that is to say, the boost Toff control module 104 may remain be adapted to adjust the off time Toff of each boost cycle to vary in an opposite direction to the output voltage Vo, and be adapted to adjust the off time Toff of each boost cycle to vary in a same direction as the input voltage Vpwr). In an embodiment, if a short-circuit fault occurs during the power converter 100 operating/working in a boost cycle, the boost cycle short circuit protection module 105 or the short circuit protection signal SP may be adapted to act on the boost Toff control module 104 to adjust the off time Toff of the boost cycle (for example, by adjusting the off time control signal CTOFF) to vary in a same direction as the output voltage Vo (i.e.: the off time Toff may increase as the output voltage Vo increases and may decrease as the output voltage Vo decreases). In an embodiment, if a short-circuit fault occurs during the power converter 100 operating/working in a boost cycle, the boost cycle short circuit protection module 105 or the short-circuit protection signal SP may be adapted to act on the boost Toff control module 104 to adjust the off time Toff of the boost cycle (for example, by adjusting the off time control signal CTOFF) to vary in an opposite direction to the input voltage Vpwr (that is, the off time Toff may decrease as the input voltage Vpwr increases, and may increase as the input voltage Vpwr decreases). In practical applications, if a short-circuit fault occurs during the power converter 100 working in a boost cycle, the output voltage Vo may drop rapidly, for example, to be at least lower than the input voltage Vpwr, and in real scenarios, the output voltage Vo may quickly drop to much lower than the input voltage Vpwr, for example, resulting in a boost duty ratio decreased to be of less than 30%. For this situation, the boost cycle short circuit protection module 105 according to various embodiments of the present disclosure may be adapted to adjust the off time Toff of the boost cycle to decrease (shorten) accordingly based on the decrease in the output voltage Vo, so as to limit the inductor current IL, thereby preventing the inductor current IL from excessively increasing due to a short circuit fault during the boost cycle.

In accordance with an exemplary embodiment of the present invention, the control circuit 102 may further comprise for example a boost cycle control module 110 that may be adapted to be coupled to the regulation module 103 and the boost off time ("Toff") control module 104. The boost cycle control module 110 may further be adapted to generate a boost cycle control signal P1 based at least on the regulation signal REG and the off time control signal CTOFF.

In accordance with an exemplary embodiment of the present invention, the control circuit 102 may further comprise for example a logic control module 109 that may be adapted to be coupled to the boost cycle control module 110. The logic control module 109 may be adapted to provide the third control signal DR3 and the fourth control signal DR4 to respectively control the third power switch SWC and the fourth power switch SWD based on the boost cycle control signal P1.

In accordance with an exemplary embodiment of the present invention, the control circuit 102 may further comprise for example a buck cycle control module 111 that may be adapted to be at least coupled to the regulation module 103 and to provide a buck cycle control signal P2 at least partially based on the regulation signal REG. One of ordinary skill in the art would understand that "partially based" here may refer to that the buck cycle control module 111 may be adapted to be further coupled to other circuit module(s) or to receive other signal(s). For instance, in the exemplary embodiment shown in FIG. 1, the buck cycle control module 111 may be adapted to further receive an on time control signal CTON which may be adapted to control the on time of the first power switch SWA during a buck cycle from e.g. a buck "AD" on time control module.

In accordance with an exemplary embodiment of the present invention, the logic control module 109 may further be adapted be coupled to the buck cycle control module 111 and may further be adapted to provide the first control signal DR1 and the second control signal DR2 to respectively control the first power switch SWA and the second power switch SWB based on the buck cycle control signal P2.

Based on the example of applying the switch module 101 illustrated in FIG. 2 to the power converter 100 illustrated in FIG. 1 to form a buck-boost power converter topology, the control circuit 102, the boost off time ("Toff") control module 104 and the boost cycle short circuit protection module 105 according to various embodiments of the present disclosure are exemplarily described above. Those skilled in the art should understand that the boost cycle short circuit protection module 105 according to various embodiments of the present disclosure may be adapted to be applied to other types of switching power converters that include boost cycle(s), so as to realize short-circuit protection control in case of short-circuit fault during its operation in a boost cycle.

Figure 3:
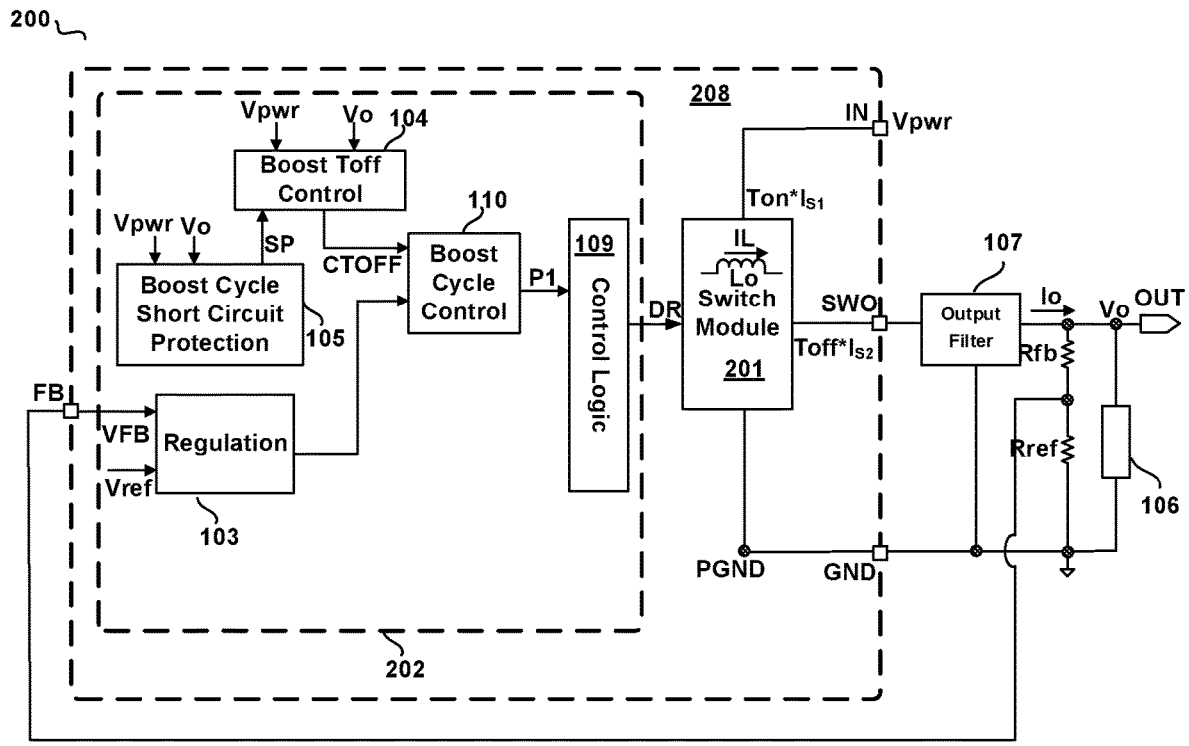
FIG. 3 illustrates a schematic diagram of a power converter 200 in accordance with an exemplary embodiment of the present invention.

For instance, FIG. 3 illustrates a schematic diagram of a power converter 200 in accordance with an alternative exemplary embodiment of the present invention. The power converter 200 shown in FIG. 3 is different from the power converter 100 shown in FIG. 1 in that a switch module 201 is used to replace the switch module 101, and a control circuit 202 is used to replace the control circuit 102. The switch module 201 and the control circuit 202 may be fabricated and/or integrated on a same semiconductor die or on separate semiconductor dies, and may be packaged in a chip 208. The circuitries or circuit elements packaged in the chip 208 may be referred to as internal circuitries or circuit elements. The power converter 200 may have an internal reference power ground PGND that may be coupled to a ground pin GND of the chip 208 through for example packaging interconnection elements such as interconnection wires or interconnection bumps etc.

Figure 4:
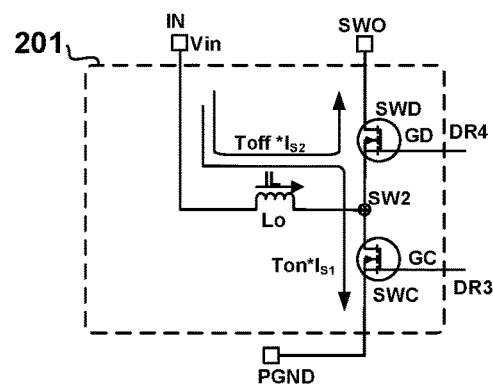
FIG. 4 illustrates a schematic diagram of a switch module 201 in accordance with an embodiment of the present invention.

As shown in the example of FIG. 4, the switch module 201 may be different from the switch module 101 shown in FIG. 2 in that the switch module 201 may not comprise the buck switch pair (the first power switch SWA and the second switch pair SWB), and thus the common connection SW2 (i.e., the second switching node SW2) of the third power switch SWC and the fourth power switch SWD may be electrically coupled (for example, electrically coupled through the inductive energy storage element Lo) to the input port IN of the power converter 200. If the switch module 201 having the configuration shown in FIG. 4 is used in the power converter 200, the power converter 200 may be referred to have a boost power conversion topology and may be referred to as a boost power converter. For this situation, operation principles of the boost power converter 200 may be similar to those of the buck-boost power converter 100 when operating in boost mode, that is, the control circuit 202 may be adapted to control the third power switch SWC and the fourth power switch SWD in the boost switch pair to perform ON and OFF switching in a complementary manner, i.e. when the third power switch SWC is switched ON, the fourth power switch SWD is switched OFF, and when the third power switch SWC is switched ON, the fourth power switch SWD is switched OFF. A switching cycle during which the control circuit 202 controls the third power switch SWC and the fourth power switch SWD to perform ON and OFF switching (or namely a switching period during which the third power switch SWC and the fourth power switch SWD operate/work and complete one turn-on and turn-off switching) may be referred to as a boost cycle. For the power converter 200, during each boost cycle, a time duration of the third power switch SWC ON and the fourth power switch SWD OFF may be referred to as the on time Ton of the boost cycle while a time duration of the third power switch SWC OFF and the fourth power switch SWD ON may be referred to as the off time Toff of the boost cycle, and generally, a fraction of the on time Ton of the third power switch SWC to an entire switching cycle of the third power switch SWC and the fourth power switch SWD (sum of the on time Ton and the off time Toff) may be referred to as a boost duty ratio. To help understanding, the example in FIG. 4 illustrates out the first switching current $I_{S1}$ and the second switching current Is2 when the power converter 200 operates in the boost mode. When operating in the boost mode, for each boost cycle, during the on time Ton, the switch module 201 may be adapted to couple the inductive energy storage device Lo to the input voltage Vpwr for energy storage through a conduction path of the third power switch SWC, and the first switching current $I_{S1}$ flows through the conduction path of the third power switch SWC; during the off time Toff, the switch module 101 may be adapted to couple the inductive energy storage device Lo to the load 106 for energy release through a conduction path of the fourth power switch SWD, and the second switching current $I_{S2}$ flows through the conduction path of the fourth power switch SWD.

In accordance with an exemplary embodiment of the present invention, the control circuit 202 shown in FIG. 3 may be different from the control circuit 102 shown in FIG. 1 in that the control circuit 202 may not comprise related circuitries and modules for buck cycle control (e.g. may not comprise the buck cycle control module 111 buck and the buck "AD" on time control module etc. of FIG. 1 that are related to buck cycle control). Those of ordinary skill in the art should understand that the configuration and coupling relationships and the operating principles of the regulation module 103, the boost off time ("Toff") control module 104, the boost cycle short circuit protection module 105, and the boost cycle control module 110, and other relevant circuits/modules used for boost cycle control in the control circuit 202 are the same as or similar to those in the control circuit 102, and will not be addressed again here. The logic control module 209 in the control circuit 202 may be different from the logic control module 109 in the control circuit 102 in that the logic control unit 209 may not be coupled to the buck cycle control module 111, and therefore may not provide the first control signal DR1 and the second control signal DR2.

Figure 5:
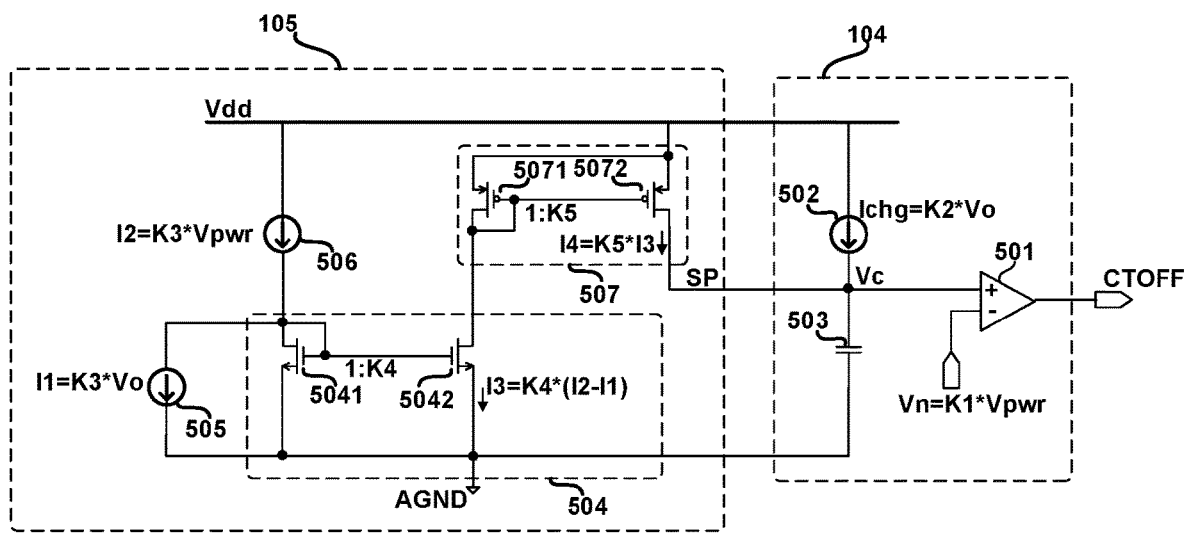
FIG. 5 illustrates a schematic diagram of a boost off time ("Toff") control module 104 and a boost cycle short circuit protection module 105 in accordance with an exemplary embodiment of the present invention.

FIG. 5 illustrates a schematic diagram of the boost off time ("Toff") control module 104 and the boost cycle short circuit protection module 105 that are adapted to be applied into the control circuit 102 and the control circuit 202 according to an exemplary embodiment of the present disclosure. The boost off time ("Toff") control module 104 may include a controllable timing circuit that may be adapted to generate the off time control signal CTOFF under the control of the input voltage Vpwr and the output voltage Vo. The off time control signal CTOFF may have a first logic level (e.g., a logic high level) and a second logic level (e.g., a logic low level) forming a digital waveform with the first logic level and the second logic level alternating. The off time control signal CTOFF may be adapted to trigger a termination of the off time Toff in a boost cycle each time it changes from, for example, the second logic level to the first logic level (in this example, it may also be understood that each transition edge of the second logic level to the first logic level may trigger the fourth power switch SWD to switch from ON to OFF in the boost cycle, or it may also be considered that, for example, the duration of each second logic level represents the off time Toff of the boost cycle). According to an exemplary embodiment of the present disclosure, referring to FIG. 5, the controllable timing circuit may be adapted to generate the off time control signal CTOFF by comparing a capacitor voltage Vc on a timing capacitor (e.g., 503) with a scaled voltage signal Vn indicative of the input voltage Vpwr, wherein the capacitor voltage Vc may be generated by charging the timing capacitor (e.g., 503) with a current source (e.g., 502) controlled by the output voltage Vo. In an embodiment, for example, the scaled voltage signal Vn may be proportional to the input voltage Vpwr with a predetermined voltage-divisional proportion coefficient K1, that is, Vn=K1*Vpwr. In the example of FIG. 5, the boost off time ("Toff") control module 104 (or the controllable timing circuit) may include a comparator 501, a first controllable current source 502, and a timing capacitor 503. The comparator 501 may be configured to receive the scaled voltage signal Vn at a first input terminal of the comparator 501 (for example, the inverting input terminal "−" of the comparator 501 in FIG. 5). A second input terminal of the comparator 501 (for example, the non-inverting input terminal "+" of the comparator 501 shown in FIG. 5) may be coupled to a first terminal of the timing capacitor 503 for receiving the capacitor voltage Vc. The comparator 501 may be adapted to compare the capacitor voltage Vc with the scalded voltage signal Vn and provide the off time control signal CTOFF at an output terminal of the comparator 501. The first controllable current source 502 may be coupled to an internal supply voltage Vdd which may be adapted for powering e.g. logic and control circuitries inside the chip 108, and may be controlled by the output voltage Vo to provide a charging current Ichg to the first terminal of the timing capacitor 503. The charging current Ichg may be proportional to the output voltage Vo with a predetermined voltage-control proportion coefficient K2, that is, Ichg=K2*Vo. A second terminal of the timing capacitor 503 may be coupled to an internal logic reference ground AGND. In this particular example shown in FIG. 5, the off time control signal CTOFF output by the comparator 501 may have the first logic level (e.g., logic high level) when the capacitor voltage Vc is higher than the scaled voltage signal Vn and may have the second logic level (e.g., logic low level) when the capacitor voltage Vc is lower than the scaled voltage signal Vn, and may be adapted to trigger a termination of the off time Toff in a boost cycle each time it changes from, for example, the second logic level to the first logic level. Therefore, the boost off time ("Toff") control module 104 in the example of FIG. 5 may adjust the off time Toff of the boost cycle to change in an opposite direction to the output voltage Vo, and may also adjust the off time Toff of the boost cycle to change in a same direction as the input voltage Vpwr.

With continued reference to FIG. 5, according to an embodiment of the present disclosure, the boost cycle short circuit protection module 105 may include a second controllable current source 505, a third controllable current source 506, a first current mirror 504, and a second current mirror 507. Those skilled in the art should understand that the terms "first", "second", "third", "fourth" and the like in this disclosure are only used to distinguish the circuit elements they modify, not to indicate sequence/priority unless the context clearly dictates otherwise. For example, the "first", "second", and "third" mentioned in the example of FIG. 5 when mentioning the first controllable current source 502, the second controllable current source 505 and the third controllable current source 506 are only used to indicate that 502, 505 and 506 are three different controllable current sources, other than used to indicate the sequence of the three controllable current sources, and it is not necessary to have the "first" to appear before the appearance of "second" and/or "third". The second controllable current source 505 may be coupled between an input terminal of the first current mirror 504 and the internal logic reference ground AGND, and may be controlled by the output voltage Vo to provide a first adjustment current I1 flowing towards the internal logic reference ground AGND. The first adjustment current I1 may be proportional to the output voltage Vo with a predetermined adjustment proportion coefficient K3, that is, I1=K3*Vo. The third controllable current source 506 may be coupled between the internal supply voltage Vdd and the input terminal of the first current mirror 504, and may be controlled by the input voltage Vpwr to provide a second adjustment current I2 flowing to the input terminal of the first current mirror 504. The second adjustment current I2 may be proportional to the input voltage Vpwr with the predetermined adjustment proportion coefficient K3, that is, I2=K3*Vpwr. The first current mirror 504 may have a predetermined first current mirror ratio K4, and may be adapted to copy the current (I2−I1) at its input terminal with the predetermined first current mirror ratio K4 to output a first mirrored current I3 at an output terminal of the first current mirror 504, that is, I3=K4*(I2−I1). In the example in FIG. 5, the first current mirror 504 is shown to include a first transistor 5041 and a second transistor 5042, a first terminal of the first transistor 5041 may function as the input terminal of the first current mirror 504, and a control terminal of the first transistor 5041 may be connected to the first terminal of the first transistor 5041 and also to a control terminal of the second transistor 5042. A first terminal of the second transistor 5042 may serve as the output terminal of the first current mirror 504, and both a second terminal of the first transistor 5041 and a second terminal of the second transistor 5042 may be coupled to the internal logic reference AGND. An input terminal of the second current mirror 507 may be coupled to the output terminal of the first current mirror 504 to receive the first mirrored current I3. The second current mirror 507 may have a predetermined second current mirror ratio K5, and may be adapted to copy the first mirrored current I3 received at its input terminal with the predetermined second current mirror ratio K4 to output a second mirrored current I4 at an output terminal of the second current mirror 507, i.e., I4=K5*I3=K5*K4*(I2−I1)= K5*K4*K3*(Vpwr−Vo). In the example shown in FIG. 5, the second current mirror 507 is illustrated to include a third transistor 5071 and a fourth transistor 5072. Both a first terminal of the third transistor 5071 and a first terminal of the fourth transistor 5072 may be coupled to the internal supply voltage Vdd (which may be provided by other modules inside the power converter 100 or 200, the internal supply voltage Vdd may be relatively stable and have a relatively low voltage value, such as 5V or 3V, suitable for powering low voltage devices inside the power converter 100 or 200). A control terminal of the third transistor 5071 may be connected to a second terminal of the third transistor 5071 and a control terminal of the fourth transistor 5072. The second terminal of the third transistor 5071 may function as the input terminal of the second current mirror 507 to receive the first mirrored current I3, and a second terminal of the fourth transistor 5072 may function as the output terminal of the second current mirror 507 to provide the second mirrored current I4. The boost cycle short circuit protection module 105 may output the second mirrored current I4 as the short circuit protection signal SP which may be sent to for example the first terminal of the timing capacitor 503 in the boost off time ("Toff") control module 104. In practical applications (e.g. when used in the power converter 100 shown in FIG. 1 or in the power converter 200 shown in FIG. 3), if the power converter 100 or 200 is normally operating in a boost cycle (e.g. during a boost cycle when the output voltage Vo is greater than the input voltage Vpwr), the first adjustment current I1 flowing to the internal logic reference ground AGND should be greater than the second adjustment current I2 flowing to the input terminal of the first current mirror 504, and thus the current flowing to the input terminal of the first current mirror 504 is zero, and the second mirrored current I4 is also zero, then the boost cycle short circuit protection module 105 or the short circuit protection signal SP has no effect on the boost off time ("Toff") control module 104. If a short-circuit fault occurs during the power converter 100 or 200 operating/working in a boost cycle, the output voltage Vo may drop rapidly below the input voltage Vpwr, resulting in the first adjustment current I1 flowing to the internal logic reference ground AGND being smaller than the second adjustment current I2 flowing to the input terminal of the first current mirror 504. Thus, for this situation, the current flowing into the input terminal of the first current mirror 504 is (I2−I1), and thereby the second mirrored current I4=K5*K4*K3* (Vpwr−Vo), which may be used as the short circuit protection signal SP to act on the first terminal of the timing capacitor 503 and contribute to charging of the timing capacitor 503, thereby adjusting duration of each second logic level of the off time control signal CTOFF (or the off time Toff of each boost cycle) to decrease (or shorten) as the output voltage Vo decreases.

The above descriptions to the boost off time ("Toff") control module 104 and the boost cycle short circuit protection module 105 according to an exemplary embodiment based on FIG. 5, is only illustrative and is not intended to be limiting. One of ordinary skill in the art should understand that the implementation of the boost off time ("Toff") control module 104 and the boost cycle short circuit protection module 105 may have a variety of ways, and various modifications and variations can be made to the exemplary boost off time ("Toff") control module 104 and the boost cycle short circuit protection module 105 according to various embodiments of the present invention.

According to an example of the present disclosure, a boost off time adaptive adjustment unit that may be adapted to adaptively adjust an off time of a switching power converter when it is operating in a boost cycle. The boost off time adaptive adjustment unit may comprise a first input terminal adapted to be coupled to an input port of the switching power converter, a second input terminal adapted to be coupled to an output port of the switching power converter, and an output terminal adapted to provide an off time control signal. The boost off time adaptive adjustment unit may be adapted to generate the off time control signal based at least on an input voltage at the input port of the switching power converter and an output voltage at the output port of the switching power converter, wherein when the switching power converter is operating normally during a boost cycle, the off time control signal may regulate the off time in the boost cycle of the switching power converter to change in an opposite direction to the output voltage (i.e., may regulate the off time to increase as the output voltage decreases and to decrease as the output voltage increases), and wherein when a short-circuit fault occurs during the switching power converter operating in a boost cycle, the off time control signal may regulate the off time in the boost cycle of the switching power converter to change in a same direction as the output voltage (i.e., may regulate the off time to increase as the output voltage increases and to decrease as the output voltage decreases). In one example, the boost off time adaptive adjustment unit may include the boost off time ("Toff") control module 104 and the boost cycle short circuit protection module 105 according to various embodiments of the present disclosure. Advantages of the boost off time adaptive adjustment unit, the boost off time ("Toff") control module 104, the boost cycle short circuit protection module 105, and the power converter (such as 100 or 200) that may be adapted to operate in boost cycle or boost mode according to the various embodiments of the present disclosure and variations thereof should not be considered to be limited to those described above. These and other advantages may be better understood by reading the detailed description of the present disclosure and studying the appended drawings of the various embodiments of the present disclosure.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

What is claimed is:

1. A power converter, comprising:
a switch module, adapted to regulate energy or power transmission from an input port to an output port of the power converter in response to at least one control signal; and
a control circuit, adapted to provide the at least one control signal to control the switch module to perform on and off switching;
wherein the control circuit comprises a boost off time adaptive adjustment unit comprising:
a first input terminal, adapted to be coupled to the input port of the power converter;
a second input terminal, adapted to be coupled to the output port of the power converter; and
an output terminal, adapted to provide an off time control signal; and wherein
the boost off time adaptive adjustment unit is adapted to generate the off time control signal based at least on an input voltage at the input port and an output voltage at the output port, and wherein when the power converter is operating normally during a boost cycle, the off time control signal is configured to regulate the off time of the boost cycle to change in an opposite direction to the output voltage, and wherein when a short-circuit fault occurs during the power converter operating in the boost cycle, the off time control signal is configured to regulate the off time of the boost cycle to change in a same direction as the output voltage.

2. The power converter of claim 1, wherein the boost off time adaptive adjustment unit further comprises:
a boost off time control module, adapted to provide the off time control signal based at least on the input voltage and the output voltage, and further adapted to adjust the off time of the boost cycle to vary in the opposite direction to the output voltage based on the off time control signal; and
a boost cycle short circuit protection module, adapted to provide a short circuit protection signal based at least on the input voltage and the output voltage, and wherein if the short-circuit fault occurs during the power converter operating in the boost cycle, the boost cycle short circuit protection module is further adapted to make the short circuit protection signal to act on the boost off time control module to adjust the off time of the boost cycle to vary in the same direction as the output voltage.

3. The power converter of claim 2, wherein when the power converter operates normally during the boost cycle, the boost cycle short circuit protection module is further adapted to make the short circuit protection signal have no effect on the boost off time control module.

4. The power converter of claim 2, wherein if a short-circuit fault occurs during the power converter operating in the boost cycle, the boost cycle short circuit protection module is further adapted to make the short circuit protection signal to act on the boost off time control module to adjust the off time of the boost cycle to vary in an opposite direction to the input voltage.

5. The power converter of claim 2, wherein the boost off time control module comprises:
a controllable timing circuit, adapted to generate the off time control signal under the control of the input voltage and the output voltage, and wherein the off time control signal has a first logic level and a second logic level and is adapted to trigger a termination of the off time in the boost cycle each time it changes from the second logic level to the first logic level.

6. The power converter of claim 2, wherein the boost off time control module is further adapted to generate the off time control signal by comparing a capacitor voltage on a timing capacitor with a scaled voltage signal indicative of the input voltage, wherein the capacitor voltage is generated by charging the timing capacitor with a current source controlled by the output voltage.

7. The power converter of claim 2, wherein the boost off time control module comprises:
- a timing capacitor, having a first terminal and a second terminal;
- a first controllable current source, configured to provide a charging current controlled by the output voltage to the first terminal of the timing capacitor; and
- a comparator, configured to receive a scaled voltage signal indicative of the input voltage at a first input terminal of the comparator, coupled to the first terminal of the timing capacitor at a second input terminal of the comparator, and adapted to provide the off time control signal at an output terminal of the comparator.

8. The power converter of claim 2, wherein the boost cycle short circuit protection module comprises:
- a first current mirror, having an input terminal and an output terminal;
- a second controllable current source, coupled between the input terminal of the first current mirror and an internal logic reference ground, and controlled by the output voltage to provide a first adjustment current flowing towards the internal logic reference ground;
- a third controllable current source, coupled between an internal supply voltage and the input terminal of the first current mirror, and controlled by the input voltage to provide a second adjustment current flowing to the input terminal of the first current mirror; and
- a second current mirror, having an input terminal coupled to the output terminal of the first current mirror, and an output terminal used as an output terminal of the boost cycle short circuit protection module to provide the short circuit protection signal.

9. The power converter of claim 1, wherein the control circuit further comprises:
- a regulation module, adapted to at least perform calculations between a feedback signal indicative of the output voltage and a reference signal to provide a regulation signal carrying information indicative of a difference between the feedback signal and the reference signal.

10. The power converter of claim 9, wherein the control circuit further comprises:
- a boost cycle control module, adapted to be coupled to the regulation module and the boost off time adaptive adjustment unit, and further adapted to generate a boost cycle control signal based at least on the regulation signal and the off time control signal.

11. A boost off time adaptive adjustment unit for controlling an off time of a boost cycle of a power converter, the boost off time adaptive adjustment unit comprising:
- a first input terminal, adapted to be coupled to an input port of the power converter;
- a second input terminal, adapted to be coupled to an output port of the power converter; and
- an output terminal, adapted to provide an off time control signal; wherein
- the boost off time adaptive adjustment unit is adapted to generate the off time control signal based at least on an input voltage at the input port and an output voltage at the output port, and wherein when the power converter is operating normally during the boost cycle, the off time control signal is configured to regulate the off time of the boost cycle to change in an opposite direction to the output voltage, and wherein when a short-circuit fault occurs during the power converter operating in the boost cycle, the off time control signal is configured to regulate the off time of the boost cycle to change in a same direction as the output voltage.

12. The boost off time adaptive adjustment unit of claim 11, further comprising:
- a boost off time control module, adapted to provide the off time control signal based at least on the input voltage and the output voltage, and further adapted to adjust the off time of the boost cycle to vary in the opposite direction to the output voltage based on the off time control signal; and
- a boost cycle short circuit protection module, adapted to provide a short circuit protection signal based at least on the input voltage and the output voltage, wherein if the short-circuit fault occurs during the power converter operating in the boost cycle, the boost cycle short circuit protection module is further adapted to make the short circuit protection signal to act on the boost off time control module to adjust the off time of the boost cycle to vary in the same direction as the output voltage.

13. The boost off time adaptive adjustment unit of claim 12, wherein the boost off time control module comprises:
- a controllable timing circuit, adapted to generate the off time control signal under the control of the input voltage and the output voltage, and wherein the off time control signal has a first logic level and a second logic level and is adapted to trigger a termination of the off time in the boost cycle each time it changes from the second logic level to the first logic level.

14. The boost off time adaptive adjustment unit of claim 12, wherein the boost off time control module is further adapted to generate the off time control signal by comparing a capacitor voltage on a timing capacitor with a scaled voltage signal indicative of the input voltage, wherein the capacitor voltage is generated by charging the timing capacitor with a current source controlled by the output voltage.

15. The boost off time adaptive adjustment unit of claim 12, wherein the boost off time control module comprises:
- a timing capacitor, having a first terminal and a second terminal, and wherein the second terminal of the timing capacitor is connected to an internal logic reference ground;
- a first controllable current source, configured to provide a charging current controlled by the output voltage to the first terminal of the timing capacitor; and
- a comparator, configured to receive a scaled voltage signal indicative of the input voltage at a first input terminal of the comparator, coupled to the first terminal of the timing capacitor at a second input terminal of the comparator, and adapted to provide the off time control signal at an output terminal of the comparator.

16. The boost off time adaptive adjustment unit of claim 12, wherein the boost cycle short circuit protection module comprises:
- a first current mirror, having an input terminal and an output terminal;
- a second controllable current source, coupled between the input terminal of the first current mirror and an internal logic reference ground, and controlled by the output voltage to provide a first adjustment current flowing towards the internal logic reference ground;

a third controllable current source, coupled between an internal supply voltage and the input terminal of the first current mirror, and controlled by the input voltage to provide a second adjustment current flowing to the input terminal of the first current mirror; and a second current mirror, having an input terminal coupled to the output terminal of the first current mirror, and an output terminal used as an output terminal of the boost cycle short circuit protection module to provide the short circuit protection signal.

17. The boost off time adaptive adjustment unit of claim 11, wherein when the power converter is operating normally during the boost cycle, the off time control signal is further configured to adjust the off time of the boost cycle to vary in a same direction as the input voltage.

18. The boost off time adaptive adjustment unit of claim 11, wherein if the short-circuit fault occurs during the power converter operating in the boost cycle, the off time control signal is further configured to adjust the off time of the boost cycle to vary in an opposite direction to the input voltage.

19. A boost cycle short circuit protection module for a power converter having a boost cycle, wherein the boost cycle short circuit protection module is adapted to provide a short circuit protection signal based at least on an input voltage and an output voltage of the power converter, wherein if a short-circuit fault occurs during the power converter operating in the boost cycle, the boost cycle short circuit protection module is further adapted to make the short circuit protection signal to adjust an off time of the boost cycle to vary in a same direction as the output voltage.

20. The boost cycle short circuit protection module of claim 19, further comprising:

a first current mirror, having an input terminal and an output terminal;

a controllable current source, coupled between the input terminal of the first current mirror and an internal logic reference ground of the power converter, and controlled by the output voltage to provide a first adjustment current flowing towards the internal logic reference ground;

another controllable current source, coupled between an internal supply voltage and the input terminal of the first current mirror, and controlled by the input voltage to provide a second adjustment current flowing to the input terminal of the first current mirror; and a second current mirror, having an input terminal coupled to the output terminal of the first current mirror, and an output terminal used as an output terminal of the boost cycle short circuit protection module to provide the short circuit protection signal.

* * * * *